United States Patent Office 2,967,810
Patented Jan. 10, 1961

2,967,810

PROCESS FOR PREPARING HIGHLY FLUORINATED COMPOUNDS

John Ferguson Harris, Jr., Wilmington, Del., assignor to E. I. du Pont de Nemours and Company, Wilmington, Del., a corporation of Delaware No Drawing. Filed Oct. 16, 1958, Ser. No. 767,503

9 Claims. (Cl. 204—158)

This invention relates to a process for the preparation of highly fluorinated compounds. More particularly, it relates to a process for the preparation of highly fluorinated carbon compounds.

Highly fluorinated carbon compounds possess utility in a variety of applications, e.g., as heat transfer agents, lubricants, dielectrics, and intermediates for chemical synthesis, and methods for their production are consequently of interest. Although a number of such methods have heretofore been described, the development of improved processes for preparing specific highly fluorinated carbon compounds readily and in good purity is a desirable goal.

It has now been found that highly fluorinated carbon compounds can be prepared by irradiating with ultraviolet light polyfluoroacyl fluoride of general formula $XR_1COF$, where X is hydrogen, fluorine, chlorine or a second carbonyl fluoride (COF) radical, and $R_1$ is a divalent aliphatic, including cycloaliphatic, perfluorocarbon radical.

In the process of this invention, the carbonyl fluoride portion of the acyl fluoride is eliminated, and the residual radicals combine. This reaction can be represented in part as follows:

$$2XR_1COF \rightarrow 2XR_1$$

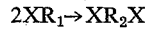
$$2XR_1 \rightarrow XR_2X$$

where X has the meaning defined above and $R_2$ is a divalent aliphatic perfluorocarbon radical composed of two or more $R_1$ radicals. It will be understood that in the particular instance where X is —H, —Cl, or —F (a subgroup which may be designated Y), $R_2$ will be a divalent perfluorocarbon radical composed of two $R_1$ units, which may be alike or different, forming a polyfluorocarbon which may be designated $YR_3Y$. Further in the particular instance where X is COF, $R_2$ will be a divalent perfluorocarbon radical composed of two or more $R_1$ units, which may be alike or different, forming a diacyl fluoride of formula $FOCR_2COF$, which may be recovered as such or as a derivative. Other products of reaction are $COF_2$, $CO_2$ and CO.

The acyl fluorides employed in this process are readily prepared by known methods, e.g., by the reaction of acyl chlorides with metal fluorides (Saunders and Stacey, J. Chem. Soc. 1948, 1772–9). The carbon skeleton of the acyl fluoride may be straight-chain or may include one or more branches or cycloaliphatic rings. The perfluoro-, omega-hydroperfluoro-, and omega-chloroperfluoroacyl fluorides constitute preferred types of acyl fluorides for use in this process.

The above reaction is conducted in the presence of actinic radiation of the type usually designated as ultraviolet light. The term "ultraviolet light" is commonly understood to mean light of wavelengths less than 4000 A., the lower limit of wavelength being determined in specific cases by the transmission characteristics of the materials through which the light must pass. The lower limit is usually in the range of 1800–2000 A. Although light of any wavelength between 1800 and 4000 A. may be employed in the present process, wavelengths of 2500–3700 A. are preferred since they are readily produced and provide sufficient energy to further expedite the desired reaction. Mercury arc lamps are convenient and commercially available sources of such radiation. These may be of several types as is well known in the art and are advantageously contained in a quartz or high-transmission glass envelope.

It is desirable that the light source be as close as possible to the reactants and this may be accomplished by placing the lamp immediately adjacent to a transparent wall of the reaction vessel or in a suitable well projecting into the reaction space. In the examples below, a low-pressure mercury resonance lamp consuming about 10 watts at 110 volts was employed. This lamp had a quartz envelope and was in the form of a helix which fitted closely around the reaction vessel.

The temperature and pressure of the reaction mixture during conversion are not critical variables and may vary within certain ranges. Although the reactants may be in the gaseous state, it is preferred for reasons of higher efficiency and conservation of space to carry out the reaction in the liquid phase. In the case of low-boiling reactants, it may be necessary to provide a reflux condenser cooled to a temperature below room temperature, for example, to about −80° C., in order to prevent loss of reactants and products, and to maintain liquid phase conditions. Higher boiling reactants may be treated at room temperature or at elevated temperatures if desired. A reaction temperature between about −80° C. and about 200° C. is usually employed. It is also possible to ensure liquid phase conditions by the application of pressures above atmospheric pressure.

The presence of diluents is not necessary to the reaction although diluents may be beneficially employed in certain cases. For example, diluents may be used to provide a high-boiling liquid medium, thereby reducing the amount of cooling and/or the pressure required to maintain low-boiling constituents in the liquid phase. The products of reaction, especially the perfluoroalkanes, the alpha,omega-dihydroperfluoroalkanes, and the alpha, omega-dichloroperfluoroalkanes are suitable for use as diluents. Other materials which may be so employed include perfluorokerosene, perfluorocyclohexane, and the like. Diluents boiling above about 20° C. are preferred.

The process of this invention is illustrated by the following examples in which the quantities are expressed in parts by weight.

Example I

Forty-six parts of perfluoro-n-butyryl fluoride was placed in a cylindrical quartz reactor having a length approximately four times the diameter and maintained at atmospheric pressure under a reflux condenser cooled with a mixture of solid carbon dioxide and acetone. The low pressure quartz mercury lamp, described above, was fitted around this reactor and the reactants irradiated for a period of 3 days. The reaction mixture was then removed from the reactor and distilled through a precision still. There was thus obtained 16.7 parts of perfluoro-n-hexane, $C_6F_{14}$, as a clear, colorless liquid, distilling at 53–57° C. The yield based on perfluoro-n-butyryl fluoride was 47% of theoretical. Examination of the product by nuclear magnetic resonance confirmed that it was perfluoro-n-hexane. Analysis gave the following results.

*Analysis.*—Calculated for $C_6F_{14}$: C, 21.3; F, 78.7. Found: C, 21.8; F, 77.8.

In another preparation of perfluoro-n-hexane, carried out as described above, the off gases from the reaction were examined by infrared spectroscopy and shown to contain $COF_2$, $CO_2$ and $CO$.

Example II

Thirty parts of omega-hydroperfluorovaleryl fluoride (also called 5-H-octafluoropentanoyl fluoride) was irradiated under the conditions described in Example I for a period of 7 days. Precision distillation of the resultant mixture gave 13.5 parts (56% of theoretical) of alpha,omega-dihydroperfluorooctane (also called 1,8-dihydrohexadecafluorooctane) as a clear, colorless liquid distilling at 134–138° C. at atmospheric pressure. The substance gave the following analysis:

*Analysis.*—Calculated for $C_8H_2F_{16}$: C, 23.9; H, 0.5; F, 75.6. Found: C, 24.2; H, 0.7; F, 74.9.

Example III

Twenty-five parts of perfluorooctanoyl fluoride was irradiated for a period of 12 days under the conditions described in Example I. Upon distillation of the reaction mixture through a small Vigreaux still, there was obtained 8.6 parts (39% of the theoretical yield) of perfluorotetradecane, distilling at 101–104° C. under 11 mm. of mercury pressure. The product solidified in the receiver forming white, plate-like crystals. The above preparation was repeated, except that irradiation was continued for only six days, at the end of which time the reaction mixture was semi-solid. Distillation gave 11.8 parts of crude perfluoro-n-tetradecane which crystallized in the receiver. After two recrystallizations from 2,2 - bis(chlorodifluoromethyl) - 3 - trifluoromethylperfluorooxetane, pure perfluoro-n-tetradecane was obtained as white plates melting at 102–103° C.

*Analysis.*—Calculated for $C_{14}F_{30}$: C, 22.8; F, 77.2. Found: C, 23.3; F, 77.0.

Example IV

Eight and six-tenths parts of omega-chloroperfluorononanoyl fluoride was irradiated for a period of 2 days under the conditions described in Example I. The solid product was scraped out of the reaction tube, and rinsed on a filter with acetone. After drying, there was obtained 6.33 parts (81% of the theoretical yield) of crude alpha,omega - dichloroperfluorohexadecane melting at 128–135° C. After recrystallization from perfluorodimethylcyclohexane, followed by sublimation (110° C., 1 mm.), the product was obtained as a white crystalline solid melting at 138.5–139.5° C.

*Analysis.*—Calculated for $C_{16}F_{32}Cl_2$: C, 22.1; F, 69.8; Cl, 8.1. Found: C, 22.3; F, 70.7; Cl, 7.9.

Example V

A mixture of 40 parts of perfluorooctanoyl fluoride and 32 parts of perfluorobutanoyl fluoride was irradiated as described in Example I for a period of 8 days. Distillation of the reaction mixture gave (*a*) 15.6 parts of perfluorohexane, boiling at 57–63° C. (the main fraction boiled at 60° C.), (*b*) 13.4 parts of product distilling at 147–154° C., and (*c*) 11.8 parts of product distilling at 108–118° C. at 17 mm. pressure. Product (*b*) was identified as perfluoro-n-decane and gave the following analysis.

*Analysis.*—Calculated for $C_{10}F_{22}$: C, 22.3; F, 77.7. Found: C, 22.6; F. 77.1.

Product (*c*), which crystallized in the receiver, was recrystallized from 2,2-bis(chlorodifluoromethyl)-3-trifluoromethylperfluorooxetane to yield perfluoro-n-tetradecane as white plates melting at 99–101° C.

Example VI

Perfluoroglutaryl difluoride (40.5 parts) was irradiated as described in Example I for a period of 4 days. The reaction mixture was completely converted to a white, polymeric solid (26.2 parts) having an average molecular weight of about 1400. Product adjacent to the walls of the reaction vessel was found to be hard and brittle and softened over a range of temperatures above 190° C., finally becoming fluid at about 250° C. Product formed in the center of the tube was softer and lower melting. It began to soften at about 100° C. and was completely fluid at about 195° C. Both products fumed on exposure to air indicating the presence of terminal carbonyl fluoride groups. The products resulting from hydrolysis of these groups were long chain perfluorodibasic acids.

The examples have illustrated the preparation of certain highly fluorinated carbon compounds by the irradiation of fluoroacyl fluorides. It will be understood, however, that the invention is not limited to these specific compounds but can be applied broadly to any compounds or mixtures of compounds, which possess the structural characteristics set forth above. Examples of other polyfluoroacyl fluorides which may be treated according to the process of this invention and the products obtained therefrom are as follows: perfluoro-n-hexanoyl fluoride→perfluoro-n-decane; difluoroacetyl fluoride→sym.-tetrafluoroethane; chlorodifluoroacetyl fluoride→sym.-dichlorotetrafluoroethane; perfluoroisobutyryl fluoride→2,3 - di(trifluoromethyl)octafluorobutane; 2,2,3,3-tetrafluoropropionyl fluoride→1,1,2,2,3,3,4,4-octafluoro-n-butane; perfluoro-n-decanoyl fluoride→perfluoro-n-octadecane. In like manner, undecafluorocyclohexanecarbonyl fluoride→docosafluorocyclohexylcyclohexane; tridecafluorocyclohexylacetyl fluoride→tetrafluoro-1,2-di(undecafluorocyclohexyl)ethane; a mixture of n-perfluorobutyryl fluoride and difluoroacetyl fluoride→perfluoro-n-hexane plus tetrafluoroethane plus 1,1,1,2,2,3,3,4,4-nonafluoro-n-butane; fluorosuccinyl fluoride, octafluoroadipyl fluoride, and the like→polydifluoromethylene compounds. In preparing polydifluoromethylene compounds, the length of the polydifluoromethylene chain can be controlled by including compounds, such as trifluoroacetyl fluoride, having a single acyl fluoride group, with the diacyl fluoride irradiated.

This invention provides a convenient method for the preparation of many fluorocarbon compounds in a high state of purity. If desired, purity adequate for direct application in many of the outlets known to the art can be achieved simply by washing the product with dilute aqueous alkali, thus avoiding the expensive step of precision distillation.

I claim:

1. A process which comprises irradiating with ultraviolet light polyfluoroacyl fluoride of the general formula $X—R_1—COF$, and recovering from the resulting mixture a condensation product of said acyl fluoride, said condensation product having the general formula $$X—R_2—X$$

whereinabove X is selected from the group consisting of —H, —Cl, —F, and —COF; $R_1$ and $R_2$ are divalent aliphatic perfluorocarbon radicals; and $R_2$ is composed of a plurality of $R_1$ units.

2. Process of claim 1 wherein the irradiation is carried out with ultraviolet light having a wavelength in the range of 2500 to 3700 angstroms.

3. Process of claim 1 wherein the polyfluoroacyl fluoride is irradiated in the liquid phase at a temperature in the rang of −80 to 200° C.

4. A process which comprises irradiating liquid polyfluoromonoacyl fluoride of general formula $Y—R_1—COF$ with ultraviolet light having a wavelength in the range of 2500 to 3700 angstroms at a temperature in the range of −80 to 200° C., and recovering from the resulting mixture a condensation product of said acyl fluoride, said condensation product having the general formula $Y—R_3—Y$, whereinabove Y is selected from the group consisting of —H, —Cl, and —F; $R_1$ and $R_3$ are divalent aliphatic perfluorocarbon radicals; and $R_3$ is composed of two $R_1$ units.

5. The process which comprises irradiating perfluorobutyryl fluoride with ultraviolet light and recovering perfluorohexane from the resulting mixture.

6. The process which comprises irradiating omega-hydroperfluorovaleryl fluoride with ultraviolet light and recovering alpha, omega-dihydroperfluorooctane from the resulting mixture.

7. The process which comprises irradiating perfluorooctanoyl fluoride with ultraviolet light and recovering perfluorotetradecane from the resulting mixture.

8. The process which comprises irradiating a mixture of perfluorobutanoyl fluoride and perfluorooctanoyl fluoride with ultraviolet light and recovering perfluorodecane from the resulting mixture.

9. The process which comprises irradiating perfluorodiacyl fluoride of general formula $FOCR_1COF$ in the liquid state with ultraviolet light having a wavelength of 2500 to 3700 angstroms at a temperature in the range of $-80$ to $200°$ C., and recovering from the resulting mixture a normally solid polymeric condensation product of general formula $FOCR_2COF$, wherein above $R_1$ is a divalent aliphatic perfluorocarbon radical and $R_2$ consists of a plurality of $R_1$ units.

References Cited in the file of this patent

Ellis et al.: The Chemical Action of Ultraviolet Rays, 1941, page 440.